United States Patent [19]
Murrey

[11] Patent Number: 5,626,524
[45] Date of Patent: May 6, 1997

[54] GUTTER CONNECTOR SPLICE AND METHOD OF CONSTRUCTING SAME

[75] Inventor: Gordon W. Murrey, Torrance, Calif.

[73] Assignee: Murrey International, Gardena, Calif.

[21] Appl. No.: 497,609

[22] Filed: Jun. 30, 1995

Related U.S. Application Data

[63] Continuation-in-part of Ser. No. 353,638, Dec. 12, 1994, abandoned.

[51] Int. Cl.$^6$ .................................................. A63D 1/08
[52] U.S. Cl. ............................. 473/113; 403/267; 403/294; 156/304.1
[58] Field of Search .................................. 473/110, 113, 473/115, 116, 54; 403/292, 294, 265, 267, 266; 156/304.1, 304.3; 238/159, 161, 243

[56] References Cited

U.S. PATENT DOCUMENTS

| | | |
|---|---|---|
| 552,801 | 1/1896 | Wiggins . |
| 2,971,759 | 2/1961 | Blatt . |
| 3,063,717 | 11/1962 | Le Mieux . |
| 3,437,360 | 4/1969 | Gould et al. ................. 403/292 |
| 4,796,887 | 1/1989 | Sternhagen . |
| 4,801,143 | 1/1989 | Heddon . |

*Primary Examiner*—William M. Pierce
*Attorney, Agent, or Firm*—Fulwider Patton Lee & Utecht, LLP

[57] ABSTRACT

A bowling ball gutter connector apparatus having supports and a splice to be mounted in an extruded, spanning manner beneath bowling ball gutter section joints such that fastening of the gutter sections leaves the upper rolling surface of the gutter unimpeded.

16 Claims, 1 Drawing Sheet

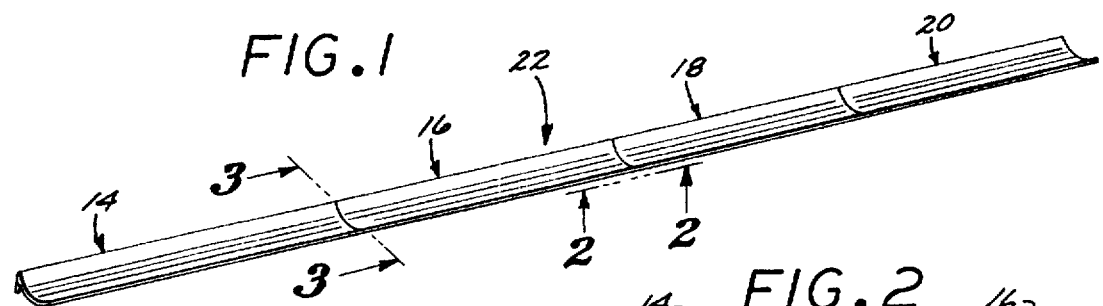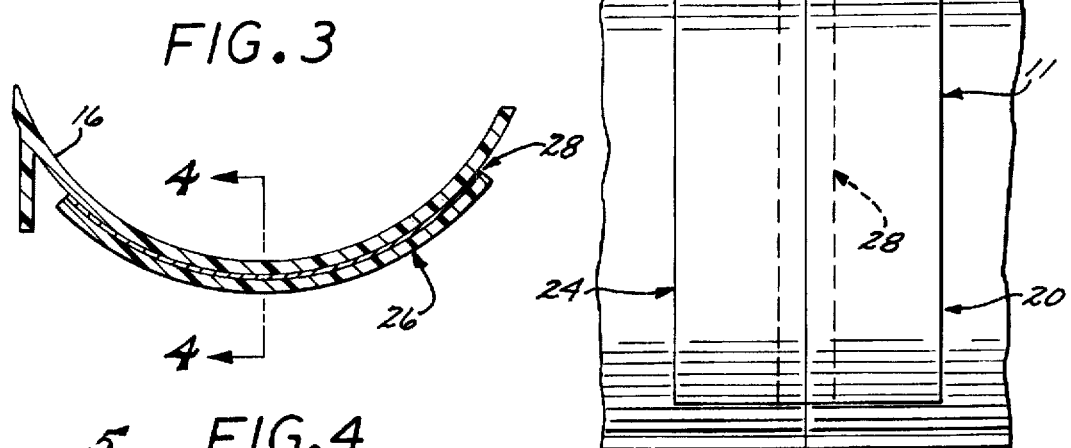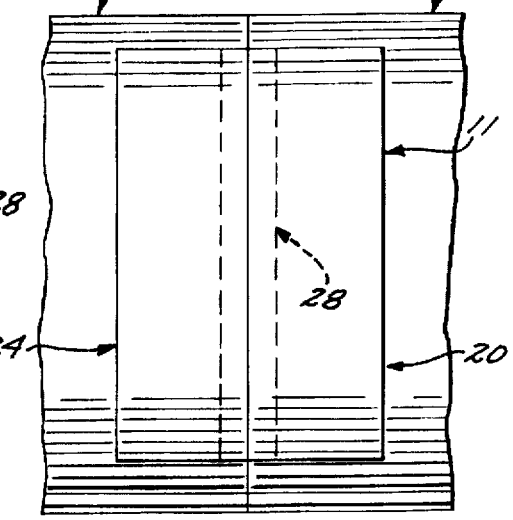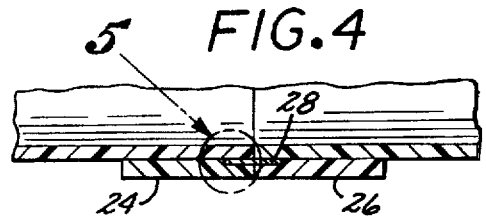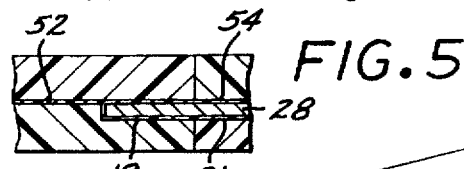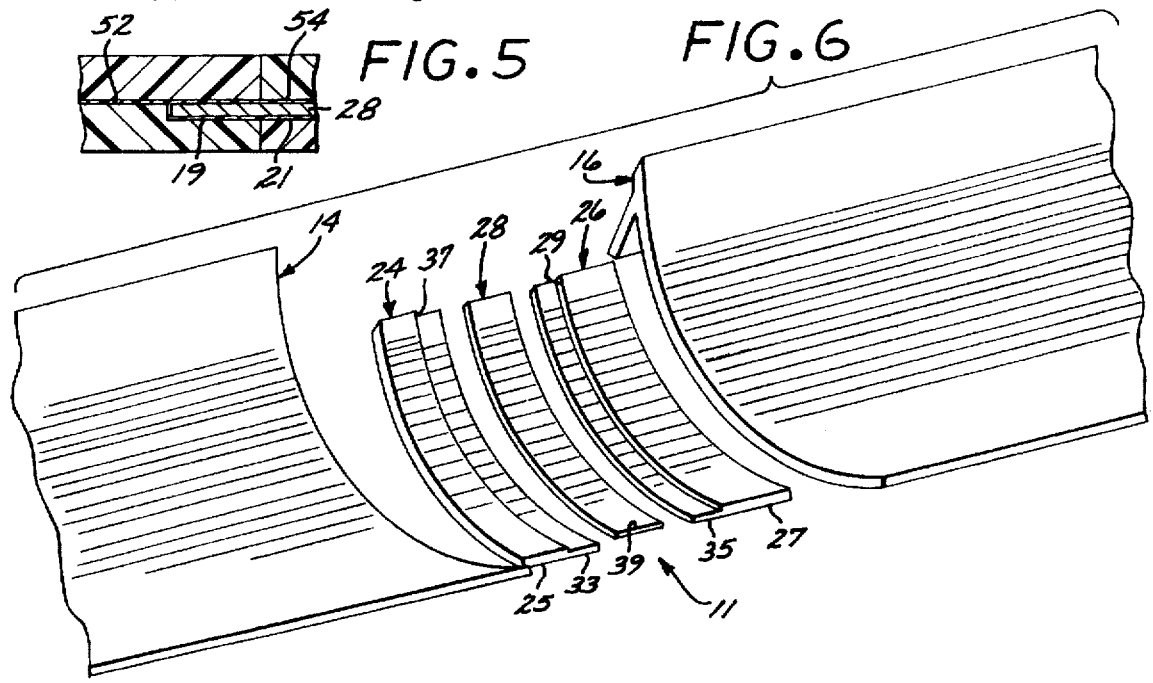

GUTTER CONNECTOR SPLICE AND METHOD OF CONSTRUCTING SAME

This application is a continuation-in-part of application Ser. No. 08/353,638, filed Dec. 12, 1994, and entitled Gutter Connector Splice and Method of Constructing Same now abandoned.

BACKGROUND OF THE INVENTION

1. Field of the Invention:

The invention relates to bowling ball gutter connection devices and more particularly to a gutter connector splice which fastens bowling ball gutters from the gutter underside, preserving a smooth upper gutter surface.

2. Description of the Prior Art:

Bowling is a professional sport in addition to being a popular form of recreation and relaxation. Hundreds of thousands of recreational bowlers participate in the sport annually and many gain particular pleasure from the distraction of league bowling. Like many sports, bowling has attracted the attention of equipment manufacturers seeking to market higher quality and more expensive products intended to enhance performance. One area that has received particular attention is the design of bowling balls themselves. The quality of design and material incorporated in such balls has grown to such an extent that the cost of producing such balls is significant. It is important to the performance of the balls that the surfaces thereof be maintained extremely smooth and be protected from scarring or marring. The challenge of bowling is to direct a ball down a sixty foot bowling lane to strike a desired pocket or pin without rolling into a flanking gutter. Since the technique employed by many bowlers relies heavily on the so-called "english" placed on the ball to cause it to curve in a controlled manner as it rolls down the surface of an alley, the uniformity of frictional contact between the ball and lane surface is of critical importance. Once either the lane surface or ball surface becomes marred or irregular, the bight of the ball on the surface of the lane will tend to vary thus causing the performance of the bowler to deteriorate and his or her score to suffer in a manner disproportionate to his or her own level of physical performance. For those less skilled in the sport, gutters flanking the sides of a lane can play a significant role during each game. Misguided balls which might otherwise careen widely off a bowling lane are to be safely captured by gutters and guided towards the lane end adjacent the bowling pins where they are delivered to a return mechanism for return to the bowler approach area.

Various different constructions have been proposed for bowling ball gutters, including molded plywood nailed in position on convex saddle supports. This construction has given way to various types of plastic gutters in effort to enhance the construction, durability and performance of the gutters. Included in the improved versions are gutters constructed of vinyl coated steel. Again, such gutters are typically constructed in segments and require metallic fasteners to join the gutter segments together, fasteners which may loosen and protrude so as to cause damage to bowling balls running thereover.

Extruded plastic gutter sections have been proposed which are fastened together on their proximate ends by semi-circular clamping straps having fastener screws connected therebetween.

Bowling lane gutters run approximately sixty feet along each side of a bowling lane. The gutters are typically formed with upwardly opening smooth concave channels to guide bowling balls the entire length of the lane. Making up the sixty foot length of gutter are four fifteen foot gutter segments, identically formed of a thermoplastic such as acrylonitrile-butadiene-styrene (ABS). The segments lie end to end and may be formed at their proximate ends with upwardly opening grooves into which are nested respective arcuate straps through which a plurality of screws project to connect on the underside with complementally shaped retainer straps to thereby sandwich the marginal ends of such sections therebetween.

Although beneficial in that current gutter connectors provide an alignment capability and offer rigid support, the strap which sandwiches the upper surface of the gutter joint lies along the upper surface of the gutter channel for tangential contact with the balls returned thereover, thus exposing such balls to surface damage due to any irregularities that may arise.

The potential damage is exacerbated by the fact that with time the screws holding the straps may loosen and partially back out thus elevating the screw heads to a point where the hard metal edges will inflict great harm on the surface of the balls rolling thereover. Thus a solution to the current problem was proposed in a previous U.S. patent whereby recesses were formed in the end of a gutter segment itself to mate with a connecting member roll formed onto the other gutter segment seeking to overlap the ends of the two segments for receipt of metal fasteners. Although beneficial in that the upper gutter channel surface would remain smooth, the disclosure is impractical due to the fact such fasteners may tend to work loose to be exposed to the surface of bowling balls rolling thereover and the added complexities in manufacturing mass gutters having open grooves in one end and protruding connecting members in the other end.

Other efforts have led to proposing bowling ball gutters to be fastened in position on support saddles or underlying frame work by means of fasteners and to then line the gutters with high density polyethylene material. A bowling ball gutter of this type is shown in U.S. Pat. No. 4,796,887 to Sternhagen. While providing some improvement, bowling ball gutter constructions of this type continue to suffer the shortcoming that metallic fasteners are required for securing the structural concave alley segment in position and then typically require metallic staples or the like to secure the surface coating in position. Thus, fabrication and installation involve a relatively expensive process and again leaves metallic fasteners free to loosen and back out and possibly cause ball damage.

Another shortcoming of the current gutter connection device involves the method of installation. Requiring holes drilled into each end of every gutter prior to installation, the current connector is practical for joining only a few gutter segments. At present, this practicality is realized due to the current practice of constructing fifteen foot gutter segments, necessitating only three gutter joint connections for every gutter. However, should shorter lengths of gutter segments be fabricated, securing the joints by straps and screws would be both time consuming and cumbersome. Thus, the cost of building a lane would be increased. Therefore, the inconvenience of replacing and repairing bowling balls and bowling lanes, coupled with the impracticality of the current method of joining gutters, leaves substantial room for improvement in the prior art gutter connector.

SUMMARY OF THE INVENTION

The gutter connector apparatus of the present invention provides alignment capability and rigid support to bowling ball gutters while preserving the smooth unbroken upper surface of the gutter channel. Potential hazards to bowling balls and bowling lanes arising from the wear and tear experienced by current gutter connectors are eliminated due to the unbroken surface in the joint to support the bowling ball without the necessity of an internal connector strap or fastener.

The invention includes bowling ball gutter sections joined end-to-end by gutter connectors which align and support the gutter sections such that the upper surface of the joint formed by two gutter sections is left unimpeded, thereby preserving the integrity of the smooth upper surface. The gutter connectors include two semi-circular splice collars molded from a thermoplastic to define open ended grooves for receipt of a semi-circular splice tongue. The collars respectively have a mount section and a retainer section. The mount sections are positioned such that the two collars lie in confronting relation to one another with the retainer sections cooperating to form the confronting grooves. The splice tongue is configured to be received in the grooves during the assembly process to form an interference fit. Matching the underside of the gutter sections, the resulting assembled connector surface is bonded symmetrically to the gutter joint in spanning relation to the gutter sections. Since the connector secures to the gutter section underside, it leaves the smooth concave upper gutter surface unbroken and free from potentially damaging impediments.

Other objects and features of the invention will become apparent from consideration of the following description taken in conjunction with the accompanying drawings.

BRIEF DESCRIPTION OF THE DRAWINGS

FIG. 1 is a perspective view of a full length bowling ball gutter incorporating the present invention;

FIG. 2 is a partial bottom view, in enlarged scale, taken along line 2—2 of FIG. 1;

FIG. 3 is an enlarged transverse sectional view taken along line 3—3 of FIG. 1;

FIG. 4 is a partial longitudinal sectional view taken along line 4—4 of FIG. 3;

FIG. 5 is a magnified view of the gutter joint within area designated 5 in FIG. 4; and FIG. 6 is an exploded view, in enlarged scale, of the bowling ball gutter shown in FIG. 1.

DESCRIPTION OF THE PREFERRED EMBODIMENT

Present day bowling ball gutters are typically assembled from four gutter sections joined end-to-end by gutter connectors. The sections may be molded, fifteen foot lengths of thermoplastic having upwardly opening concave surfaces. Joining of the section ends has previously been accomplished by the use of straps and securing screws which sandwich the upper concave surface and the gutter underside to provide a connection therewith. The connection further provides lateral support and aligns the upper concave surfaces of the adjoining gutter sections. However, over a period of time, vibration may cause the screws to work loose and this, coupled with normal wear and tear to the upper strap, creates a hazard for bowling balls rolling over the strap and increases the maintenance costs to upkeep bowling lanes. The present invention reduces these deficiencies by providing a connecting device which spans the underside surface of the gutter joint, thus eliminating straps and screws raised above the gutter upper surface.

As shown in the drawings for purposes of illustration, the invention in a preferred embodiment is a gutter connector apparatus comprising, generally, connector splice assemblies 11 used to join individual fifteen foot gutter sections 14, 16, 18 and 20 in an end-to-end fashion resulting in a full length sixty foot bowling ball gutter 22. The connector splice assemblies 11 include, respectively, a semi-circular splice tongue 28 and two semi-circular collars 24 and 26 which are mirror images of one another. Bonded together, the splice tongue and collars cooperate to form a connection apparatus for spanning and securing the joint between adjacent gutter section ends.

Referring to FIGS. 2–6 in further detail, the respective collars 24 and 26 are similarly formed of rigid semi-circular thermoplastic saddles using generally well known injection molding techniques. Thermoplastics such as acrylonitrile-butadiene-styrene (ABS) or polyvinylchloride (PVC) are well suited for this application, although any other suitable plastic may suffice. In a preferred embodiment, the thickness of each collar is approximately ⅛″ with a circumferential width of 10″ and a length of approximately 4″. The collars are in the form of mounting necks 25 and 27 configured of a diameter to nest on the circumference of the gutter sections and are then stepped by a predetermined thickness to form respective annular shoulders 37 and 29 and distally projecting retainers 33 and 35. When assembled to the gutter section undersides, the retainers cooperate therewith to define axially open ended radial grooves of a thickness corresponding to the stepped predetermined thickness of the annular shoulders. It will be appreciated by those familiar with the art that fabricating the collars using material and techniques used to mold gutter sections will enable manufacturers to efficiently make the collars. Such flexibility in a factory offers substantial cost savings in producing the present invention as compared to the prior art employing straps and fastener screws.

The splice tongue 28 consists of a semi-circular metal strap for friction fit in close spaced relation in the open ended grooves formed between the respective retainers and the underside of the respective gutter sections. The dimensions set out above must be within close tolerances with respect to the retainer sections 33 and 35 as the tongue must frictionally fit within the retainer grooves 19 and 21. The upper surface 39 of the tongue is curved to match the undersides of two gutter sections joined end-to-end.

Assembling the splice collars 24 and 26 to the gutter sections 16 and 18 involves bonding the collars proximate to the ends of the gutter section undersides such that the retainer sections form outwardly opening grooves 19 and 21 with the gutter section undersides. Preferably, the respective splice collars 24 and 26 are bonded to the underside of the respective sections 16 and 18 by means of a thermoplastic bonding agent or solvent 52 and 54 during the factory manufacturing process to leave the open ended grooves 19 and 21 for slidable endwise receipt of the splice tongue at the installation site. Thermoplastic solvents used in this application are capable of producing what is commonly known in the art as a "solvent weld". Such welds are formed as the parts are joined due to a dissolving action the solvent has on the applied surfaces. Once the partially dissolved surfaces are joined and cured, a fusing of the surfaces results, creating a virtually unbreakable bond. For ABS plastic components, a preferred solvent is Weld-On 4707, manufactured by IPS Corp., while for PVC components, any suitable PVC cement is acceptable.

The pre-fabricated gutter sections may be conveniently stored for inventory and can be easily transported to the installation site. It will be appreciated that the sections 16 and 18 will be typically laid out in end-to-end relation on concave saddles framed in the gutter of the bowling alley lane to be constructed.

The sections 14, 16, 18 and 20 may then be easily installed by laying them generally in end-to-end relationship on the substructure defining the support frame work in loose arrangement with the proximate ends spaced apart for access to the respective grooves. The splice tongues 28 may then be selected and the respective one ends thereof aligned in the open end of one of the retaining grooves 19. The other end of the respective tongue may be aligned with the open end of the mating groove 21 and, when all such tongues at the respective joints between the respective sections 14, 16, 18 and 20 are aligned and started in position, a workman might block one end of the overall alley construction and another workman drive on the opposite end thereof by, for instance, placing a wooden header over the end thereof and driving it with a wooden mallet or the like to force the sections in compression toward one another thus driving the bodies of such sections and the collars 24 and 26 securely over the respective splice tongues 28 to force such splice tongues into interference fits with such collars and abut the respective proximate ends of such sections in firm endwise abutting relationship to form a continuous uninterrupted joint. The resulting connections will thus form high strength, high integrity joints which define a smooth and uninterrupted concave surface of thermoplastic material fully protected from the splice tongue 28 and without any metallic fasteners directly or indirectly exposed to the concave gutter surface which will direct the bowling balls thereover during the service life.

From the foregoing, it will be apparent that the bowling alley splice connector of the present invention is economical and convenient to manufacture allowing for production line fabrication at a factory site. The resultant connector is convenient to store and transport to the installation site. Installation is relatively straightforward and non-labor intensive. Furthermore, the resultant joint is strong and will provide a long service free life without danger of exposing the surface guttered bowling balls to damage from metallic fasteners or the like.

Various modifications and changes may be made with regard to the foregoing detailed description without departing from the spirit of the invention.

What is claimed is:

1. A bowling ball gutter apparatus comprising:
   a plurality of upwardly opening semi-circular concave gutter sections of respective selected lengths with respective undersides to abut one another in end-to-end relation to define a smooth joint line between said sections;
   respective pairs of elongated arcuate semi-circular splice collars formed with respective mount sections for mounting to the respective undersides at an end of a respective gutter section and having respective retainer sections projecting therefrom and spaced a selected distance from said undersides when said mount sections are mounted to the respective undersides of said respective gutter section to cooperate therewith in forming respective confronting open ended arcuate grooves;
   a bonding agent interposed between the respective mount sections and undersides of the respective gutter sections to bond the respective pairs of splice collars to said respective gutter section; and
   respective elongated, arcuate splice tongues having opposing sides disposed in spanning relation between the confronting open ended arcuate grooves to form a structural support connecting abutting gutter sections without degrading said joint line therebetween.

2. A Bowling ball gutter apparatus as set forth in claim 1 wherein:
   said gutter sections and splice collars are formed from a thermoplastic material.

3. A Bowling ball gutter apparatus as set forth in claim 2 wherein:
   said thermoplastic material is acrylonitrile-butadienestyrene.

4. A Bowling ball gutter apparatus as set forth in claim 2 wherein:
   said thermoplastic material is polyvinylchloride.

5. A Bowling ball gutter apparatus as set forth in claim 1 wherein:
   said bonding agent is a thermoplastic solvent for creating a solvent weld.

6. A Bowling ball gutter apparatus as set forth in claim 1 wherein:
   said splice tongues are formed from a metallic material and configured to complementally fit into said grooves and along said gutter section undersides.

7. A bowling ball gutter apparatus comprising:
   a plurality of thermoplastic upwardly opening semi-circular concave gutter sections of respective selected lengths with respective undersides to abut one another in end-to-end relation to define a smooth joint line between said sections;
   respective pairs of elongated arcuate semi-circular splice collars formed with relation to define a smooth joint line between said sections; respective mount sections for mounting to the respective undersides at an end of a respective gutter section and having respective retainer sections projecting therefrom and spaced a selected distance from said undersides when said mount sections are mounted to the respective undersides of said respective gutter section to cooperate therewith in forming respective confronting open ended arcuate grooves;
   bonding means to bond the respective pairs of splice collars to said respective gutter section; and
   respective metallic elongated, arcuate splice tongues having opposing sides disposed in spanning relation between the confronting open ended arcuate grooves to form a structural support connecting abutting gutter sections without degrading said joint line therebetween.

8. A Bowling ball gutter apparatus as set forth in claim 7 wherein:
   said bonding means comprises a thermoplastic solvent for creating a solvent weld and interposed between said respective mount sections and gutter section undersides to form such weld.

9. A bowling ball gutter connector for connecting a plurality of bowling ball gutter sections of the type having respective smooth concave upper surfaces and undersides and aligned end to end to define smooth joint lines between said sections, said connector including;
   respective pairs of elongated arcuate semi-circular splice collars formed with respective mount sections for mounting to the respective undersides of a respective gutter section and having respective retainer sections projecting therefrom for spacing a selected distance from said undersides when said mount sections are mounted to the respective undersides of said respective gutter section to cooperate therewith in forming respective confronting open ended arcuate grooves; and respective elongated, arcuate splice tongues having opposing sides to be disposed in spanning relation between the confronting open ended arcuate grooves to form a structural support connecting abutting gutter sections without degrading said joint line therebetween.

10. A Bowling ball gutter connector apparatus as set forth in claim 9 wherein:

said gutter sections and splice collars are formed from a thermoplastic material.

11. A Bowling ball gutter connector apparatus as set forth in claim 10 wherein:

said thermoplastic material is acrylonitrile-butadienestyrene. styrene.

12. A Bowling ball gutter connector apparatus as set forth in claim 10 wherein:

said thermoplastic material is polyvinylchloride.

13. A Bowling ball gutter connector apparatus as set forth in claim 9 wherein:

said respective tongues are formed from a metallic material.

14. A method of constructing a bowling ball gutter assembly including:

selecting elongated gutter sections of the type constructed of a thermoplastic material having smooth concave upper surfaces and respective selective lengths and respective undersides with respective ends and including respective pairs of splice collars disposed at the ends of the respective undersides in confronting relation, said collars configured with respective retainer sections spaced from the respective undersides of said gutter sections when said mount sections are mounted to the respective undersides of said respective gutter section to form respective confronting arcuate grooves;

selecting arcuate splice tongues to complementally fit in the respective grooves along said gutter section undersides;

installing said gutter sections at an installation site in end-to-end relationship with the respective grooves aligned endwise with one another;

aligning the respective tongues with the respective grooves;

driving said gutter sections longitudinally toward one another to slide said grooves relative to the respective tongues until said gutter sections abut one another causing said grooves to surround said tongues whereby a structural connection is formed along the abutting undersides of said connected gutter sections thereby leaving the smooth concave upper surface of said gutter sections unimpeded.

15. A method of constructing a bowling ball gutter assembly according to claim 14 wherein:

said step of selecting elongated gutter sections includes selecting gutter sections having pairs of collars configured with respective retainer sections spaced a predetermined distance from said undersides to form open ended grooves of a predetermined radial thickness; and said step of selecting arcuate splice tongues includes selecting arcuate splice tongues having a thickness corresponding to said predetermined radial thickness to frictionally fit in the respective grooves.

16. A method of constructing a bowling ball gutter assembly including:

selecting elongated gutter sections constructed of a thermoplastic material having smooth concave upper surfaces and respective lengths and respective undersides with respective ends;

selecting pairs of splice collars of the type having respective mount sections for mounting to the respective undersides of the respective gutter sections and respective stepped retainer sections projecting therefrom;

selecting a thermoplastic solvent;

applying said thermoplastic solvent to said pairs of splice collars;

mounting said pairs of splice collars to said gutter section undersides with said thermoplastic solvent in contact with said undersides, said respective retainer sections cooperating with said respective undersides to form respective grooves disposed at the ends of said gutter sections;

selecting arcuate splice tongues to frictionally fit in the respective grooves along said gutter undersides;

installing said gutter sections at an installation site in end-to-end relationship with the respective grooves aligned endwise with one another;

aligning the respective tongues with the respective grooves;

driving said sections longitudinally toward one another to frictionally slide said grooves relative to the respective tongues thereby forming an interference fit until said gutter sections abut one another causing said grooves to surround said tongues whereby a structural connection is formed along the abutting undersides of said connected gutter sections thereby leaving the smooth concave upper surface of said gutter sections unimpeded.

\* \* \* \* \*

UNITED STATES PATENT AND TRADEMARK OFFICE
CERTIFICATE OF CORRECTION

PATENT NO. : 5,626,524
DATED : MAY 6, 1997
INVENTOR(S) : Gordon W. Murrey

It is certified that error appears in the above-identified patent and that said Letters Patent is hereby corrected as shown below:

Column 6, lines 33 and 34, delete "relation to define a smooth joint line between said sections:".

Signed and Sealed this

Eighth Day of July, 1997

Attest:

BRUCE LEHMAN

Attesting Officer

Commissioner of Patents and Trademarks